Figure 2:
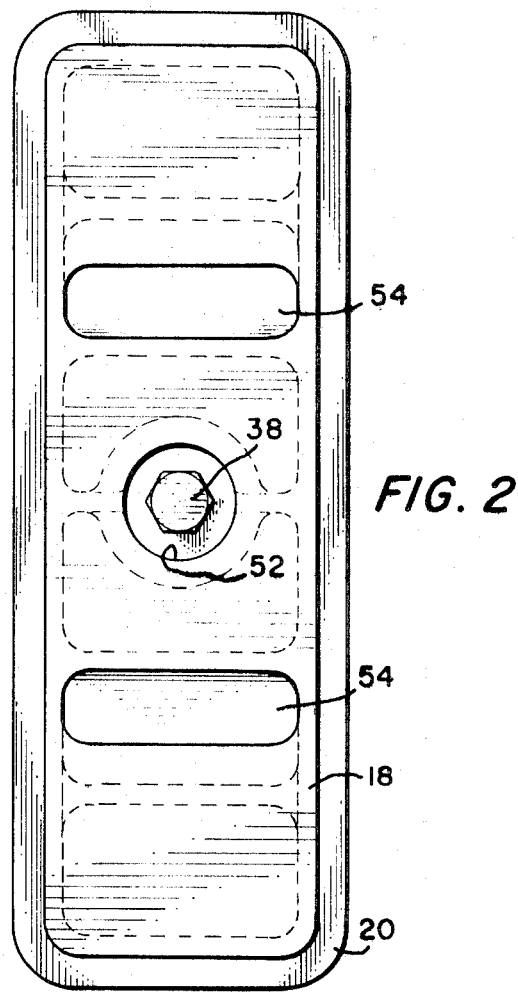

United States Patent

[11] 3,627,169

| [72] | Inventors | Frank D. Howe;<br>Robert W. Decker, both of Painted Post, N.Y. |
|---|---|---|
| [21] | Appl. No. | 857,887 |
| [22] | Filed | Sept. 15, 1969 |
| [45] | Patented | Dec. 14, 1971 |
| [73] | Assignee | Ingersoll-Rand Company<br>New York, N.Y. |

[54] MEMBER AND METHOD FOR CLOSING AN OPENING IN A PRESSURE CHAMBER
4 Claims, 2 Drawing Figs.

[52] U.S. Cl. .................................................... 220/55 R, 220/55.3
[51] Int. Cl. ........................................................ B65d 45/00
[50] Field of Search............................................. 220/25, 55.3, 94 A, 55 R

[56] References Cited
UNITED STATES PATENTS

| 1,452,047 | 4/1923 | Hodgson ..................... | 220/25 |
| 2,729,359 | 1/1956 | Gugeler ....................... | 220/25 |
| 2,913,140 | 11/1959 | Vuillemerot ................ | 220/94 A X |

FOREIGN PATENTS

| 5,151 | 1902 | Great Britain............... | 220/25 |

Primary Examiner—George E. Lowrance
Attorneys—Carl R. Horten, David W. Tibbott and Bernard J. Murphy ABSTRACT: An inside-out closure member for closing an access opening in a pressure chamber, and a method for practicing its use. The member is a plate of greater overall dimension than the opening and carries a jacking bolt, in penetration thereof, for bearing against an inner surface of the chamber. Chamber pressure holds the plate in closure position after, according to the method, the jacking bolt is used to first constrain the plate in alignment over the opening.

Patented Dec. 14, 1971 3,627,169

INVENTORS
FRANK D. HOWE
ROBERT W. DECKER
BY
*Bernard J. Murphy*
AGENT

MEMBER AND METHOD FOR CLOSING AN OPENING IN A PRESSURE CHAMBER

This invention pertains to closure members for, and to methods for closing openings in, pressure chambers and especially to such members of the inside-out-type in which pressure within the chamber is employed to hold the same in place.

It is already known in the prior art to employ chamber pressure to constrain a closure member in place, However, the known practices employ externally protruding hardware for initially restraining the member in place, and to retain it thereat when the chamber is depressurized. Typically the known practices employ a U-shaped clamp which penetratively receives a stud or bolt extending from the outer face of the closure member or plate, and a nut is threaded onto the stud to secure the plate and clamp in fast engagement; the footings of the clamp bear against external surfaces of the chamber. Besides being unsightly, these externalized and protruding hardware arrangements present hazardous obstructions for personnel working near the pressure chamber or vessel. Also, implements such as heavy tools or swaying hoists, and the like, will occasionally shear the stud and cause a release of the clamp so that when the pressure chamber is depressurized, the plate will fall inside.

It is an object of this invention, therefore, to provide both a member and a method for closing an opening in a pressure chamber without using external, projecting hardware. Another object of this invention is to provide a member and a method, as noted, employing means disposed within the chamber for initially constraining the member in alignment over the access opening.

A feature of this invention comprises the use of a closure member which is a plate having overall dimensions greater than the opening for which it is employed, and which has a jacking bolt in penetration thereof and threaded therewith for bearing against an inner surface of the pressured chamber.

Figure 1:
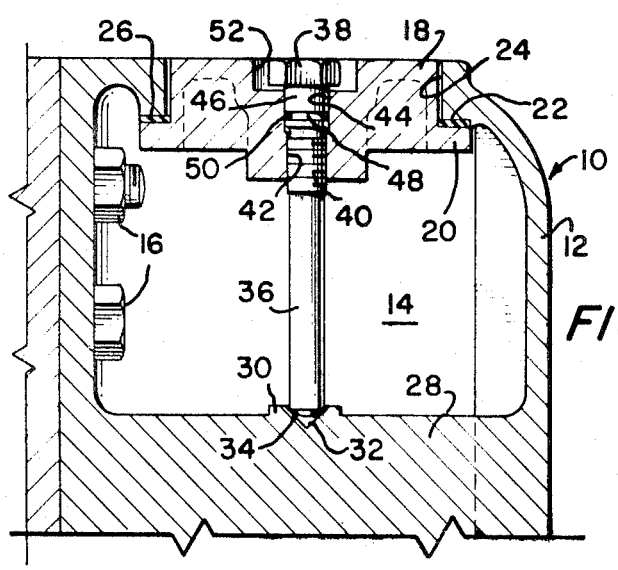

Further objects and features of this invention will become more apparent, by reference to the following description taken in conjunction with the accompanying figures, in which:

FIG. 1 is a cross-sectional view, in elevation, of a portion of a gas compressor; the figure illustrates a part of a pressure chamber, of such a compressor, which has an access opening provisioned therein, with the novel closure member positioned therein; and FIG. 2 is a front or external view of the closure member, according to our invention, shown in isolation from the compressor and chamber.

As shown in FIG. 1, a portion of a gas compressor 10 is shown having a valve-head compartment 12 which defines a pressure chamber 14. The valve-head compartment 12 is formed with an opening provided for facilitating access to valves (not shown) and to assembly hardware 16. The closure member 18, according to this invention, is a plate which has a peripheral lip 20 disposed for engagement with a peripheral rim 22 of the compartment access opening 24. A gasket 26, of compliant material, is interposed between the lip and rim for fluid-sealing the access opening 24.

The pressure chamber 14 has an inner wall surface 28 which comprises a boss 30. The boss 30 has a recess 32 formed therein for receiving the bearing point 34 of a jacking bolt 36. The bolt 36 has a hexagonal head 38 and is threaded at 40 for threaded engagement with a threaded bore 42 formed in plate 18. Plate 18 is also counterbored at 44, and bolt 36 has a correspondingly enlarged shank portion 46 for nesting thereof with counterbore 44. Shank portion 46 has a circular groove 48 which receives a compliant O-ring seal 50 therein. Additionally, plate 18 has a circular recess 52 in which the head 38 of the bolt 36 is confined. Therefore, when the bolt is fully torqued against recess 32, and the plate 18 is constrained in position, nothing protrudes beyond the external surface of the valve-head compartment 12.

In FIG. 2, a front or external view of the novel closure member or plate 18 is shown apart from the compressor, or other pressure vessel, in which it can be employed. The front face of plate 18 has a pair of finger-grip recesses 54 formed therein to facilitate the manipulation of the plate at installation and removal.

In practice, the closure member or plate 18 would first have the bolt 36 partially, threadedly backed out of bore 42—or fully removed from the plate 18 entirely. Then, using the finger-grip recesses 54, the plate 18 is manipulated and inserted into the pressure chamber 14 diagonally, according to the practice common with inside-out covers, and pulled up against the peripheral rim 22. Next, the bolt 38 is threadedly turned in bore 42 with the point 34 closing upon recess 32. The bolt is turned until the point 34 bears against, and thrusts from recess 32 and an initial "crush" is established in gasket 26 to provide an initial closure or sealing of opening 24. Thereafter the compressor or pressure vessel is pressurized, whereupon internal pressure in chamber 14 constrains plate 18 even more firmly against access opening 24. Therefore, it is the internal pressure which holds plate 18 in place, and insures a sealing of chamber 14. However, there is no external projecting member presented by this plate or closure member, and the method for practicing its use, for intrusive obstruction of personnel or for damaging, shearing impacting by implements or tools.

While we have described our invention in connection with a specific embodiment thereof, it is to be clearly understood that this is done only by way of example and not as a limitation to the scope of our invention as set forth in the objects thereof.

We claim:

1. In combination with a gas compressor having a pressure chamber with an access opening, a closure member for said opening, comprising:
   plate means for overlying said opening internally of said chamber; and
   means carried by said plate means, cooperative with internal surfacing of said chamber, for constraining said plate means against said opening;
   said constraining means being in penetration of said plate means, and being disposed within said chamber; and
   said plate means comprising a plate having an outer, external surface, relative to said chamber, which is substantially uniplanar and which, with constraint thereof against said opening, is cooperative with external surfacing of said chamber to define a substantially continuous and substantially uniplanar exterior chamber wall;
   said constraining means comprising a headed jacking bolt, the shank of said bolt extending from one side of said plate, and the head thereof being exposed on the other side of said plate;
   said bolt and said plate both being mutually threaded to facilitate relative movement therebetween to constrain said plate means, and being cooperative to effect a recessed confinement of said bolt head and an unobstructed clearance of the exterior plane of said wall; and wherein
   said bolt has a bearing point, at the terminal end thereof which is opposite said head, for rotational movement thereof relative to said internal surfacing,
   said internal surfacing having a boss providing a thrust bearing for said bolt and means, and said boss having a recess therein which receives said bearing point and confines said terminal end thereat during operation thereof.

2. A closure member, according to claim 1, wherein:
   said plate means further includes compliant means disposed between said plate and a peripheral surface of said opening for fluid sealing said opening.

3. A closure member, according to claim 2, wherein:
   said plate has a peripheral lip thereabout, which abuts said peripheral surface, and further has a raised portion bounded by said lip which extends into said opening for effecting the closure thereof.

4. A closure member, according to claim 3, wherein:

said plate further has relieved portions formed in the external face thereof provisioned as fingergrips to facilitate the manipulation of the plate.

* * * * *